(12) United States Patent  
Chan et al.

(10) Patent No.: US 9,218,051 B1  
(45) Date of Patent: *Dec. 22, 2015

(54) VISUAL PRESENTATION OF VIDEO USAGE STATISTICS

(75) Inventors: Tracy Patrick Chan, San Francisco, CA (US); Thomas Broxton, Mountain View, CA (US); Oliver Heckmann, Ruschlikon (CH); Nicholas Jakobi, Zurich (CH); Uwe Maurer, Zurich (CH); Shashi Seth, Foster City, CA (US); Jonas Yngvesson, Binz (CH)

(73) Assignee: Google Inc., Mountain View, CA (US)

( * ) Notice: Subject to any disclaimer, the term of this patent is extended or adjusted under 35 U.S.C. 154(b) by 832 days.

This patent is subject to a terminal disclaimer.

(21) Appl. No.: 13/405,773

(22) Filed: Feb. 27, 2012

Related U.S. Application Data

(63) Continuation of application No. 12/412,062, filed on Mar. 26, 2009, now Pat. No. 8,151,194.

(60) Provisional application No. 61/039,751, filed on Mar. 26, 2008, provisional application No. 61/097,130, filed on Sep. 15, 2008, provisional application No. 61/161,163, filed on Mar. 18, 2009.

(51) Int. Cl.  
*G06F 3/01* (2006.01)

(52) U.S. Cl.  
CPC ........................................ *G06F 3/01* (2013.01)

(58) Field of Classification Search  
CPC ........ G06F 3/01; G06F 3/0484; G06F 3/0481  
USPC ......... 715/744, 781, 201, 719, 738, 748, 830; 725/96; 709/203, 204, 226, 224; 345/157, 418, 426, 8  
See application file for complete search history.

(56) References Cited

U.S. PATENT DOCUMENTS

| | | | | |
|---|---|---|---|---|
| 4,302,755 | A * | 11/1981 | Pisani et al. | 345/157 |
| 6,185,585 | B1 * | 2/2001 | Sequeira | 715/201 |
| 6,307,526 | B1 * | 10/2001 | Mann | 345/8 |
| 7,266,771 | B1 * | 9/2007 | Tow et al. | 715/719 |
| 7,996,771 | B2 * | 8/2011 | Girgensohn et al. | 715/723 |
| 8,151,194 | B1 * | 4/2012 | Chan et al. | 715/716 |
| 8,577,996 | B2 * | 11/2013 | Hughes et al. | 709/219 |
| 2003/0038796 | A1 * | 2/2003 | van Beek et al. | 345/418 |
| 2006/0059205 | A1 * | 3/2006 | Shah et al. | 707/200 |
| 2007/0143348 | A1 * | 6/2007 | Rosenberg | 707/104.1 |
| 2007/0250901 | A1 * | 10/2007 | McIntire et al. | 725/146 |
| 2008/0005101 | A1 * | 1/2008 | Chandra | 707/5 |
| 2008/0059889 | A1 * | 3/2008 | Parker et al. | 715/748 |
| 2008/0154889 | A1 * | 6/2008 | Pfeiffer | 707/5 |
| 2008/0172615 | A1 * | 7/2008 | Igelman et al. | 715/719 |

(Continued)

*Primary Examiner* — Doon Chow  
*Assistant Examiner* — David Choi  
(74) *Attorney, Agent, or Firm* — Fenwick & West LLP

(57) ABSTRACT

A system, method, and various software tools enable a video hosting website to graphically display statistics of data associated with videos posted on a video hosting website. Data associated with videos is collected, analyzed and stored. A graphical representation of the data and corresponding geographic map are generated based on the collected data. The graphical representation shows the data along a timeline. The corresponding geographical map shows the data by geographic market. The graphical representation and geographical map are associated such that a modification to the graphical representation modifies the geographical map accordingly and a modification to the geographical map modifies the graphical representation accordingly.

16 Claims, 18 Drawing Sheets

(56) References Cited

U.S. PATENT DOCUMENTS

| | | | |
|---|---|---|---|
| 2008/0195596 A1* | 8/2008 | Sisk et al. | 707/5 |
| 2008/0209343 A1* | 8/2008 | Macadaan et al. | 715/747 |
| 2008/0259155 A1* | 10/2008 | McLelland et al. | 348/14.03 |
| 2009/0076899 A1* | 3/2009 | Gbodimowo | 705/14 |
| 2009/0083417 A1* | 3/2009 | Hughes et al. | 709/224 |
| 2009/0099900 A1* | 4/2009 | Boyd et al. | 705/10 |
| 2009/0100456 A1* | 4/2009 | Hughes | 725/14 |
| 2009/0158214 A1* | 6/2009 | Arnold et al. | 715/830 |
| 2011/0060998 A1* | 3/2011 | Schwartz et al. | 715/738 |
| 2011/0068478 A1* | 3/2011 | Pagaila et al. | 257/774 |
| 2011/0084964 A1* | 4/2011 | Gould et al. | 345/426 |
| 2011/0107369 A1* | 5/2011 | O'Brien et al. | 725/38 |

* cited by examiner

VISUAL PRESENTATION OF VIDEO USAGE STATISTICS

CROSS REFERENCE TO RELATED APPLICATIONS

This application is a continuation of U.S. application Ser. No. 12/412,062, filed on Mar. 26, 2009, which claims the benefit of U.S. Provisional Applications 61/161,163, filed on Mar. 18, 2009; 61/097,130, filed Sep. 15, 2008; and 61/039,751, filed on Mar. 26, 2008. Each application is incorporated by reference herein in its entirety.

BACKGROUND

1. Field of Art

The present invention relates generally to web-based video, and more particularly to software tools and methods for capturing and displaying metrics related to web-based videos.

2. Description of the Related Art

Video hosting websites contain millions of videos containing user-generated and other content. Often, contributors post such videos on these websites in order to share content that they consider interesting or appealing to a general or particular audience. Some contributors post videos for the purpose of monetizing the video. Some video hosting websites allow viewers to comment on posted videos. In general, contributors do not know very much about who is viewing their video or from where their video is being viewed.

SUMMARY

The present invention enables a video hosting website to measure and graphically display statistics of data associated with views of videos on a video hosting website. Data associated with views of videos is collected, analyzed and stored. A report of the view data across time and a corresponding geographic map are generated based on the collected data. The report is displayed either textually or graphically. One graphical representation shows the data along a timeline. The corresponding geographic map shows the data by geographic location. The graphical representation and geographic map are associated such that a modification to the time frame active on the graphical representation modifies the geographic map accordingly and a modification to the geographic map modifies the graphical representation accordingly. Thus, the geographic map shows a number of views in selected geographic areas for a selected timeframe. Additional reports provide insight into demographics of viewers, including age and gender. The popularity of a video and its relative ability to hold the attention of its audience is also tracked. Comments, favoriting and rating of videos are also used to develop a measure of community engagement with each video.

The features and advantages described in the specification are not all inclusive and, in particular, many additional features and advantages will be apparent to one of ordinary skill in the art in view of the drawings, specification, and claims. Moreover, the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the instructions and methods illustrated herein may be employed without departing from the principles of the invention described here.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
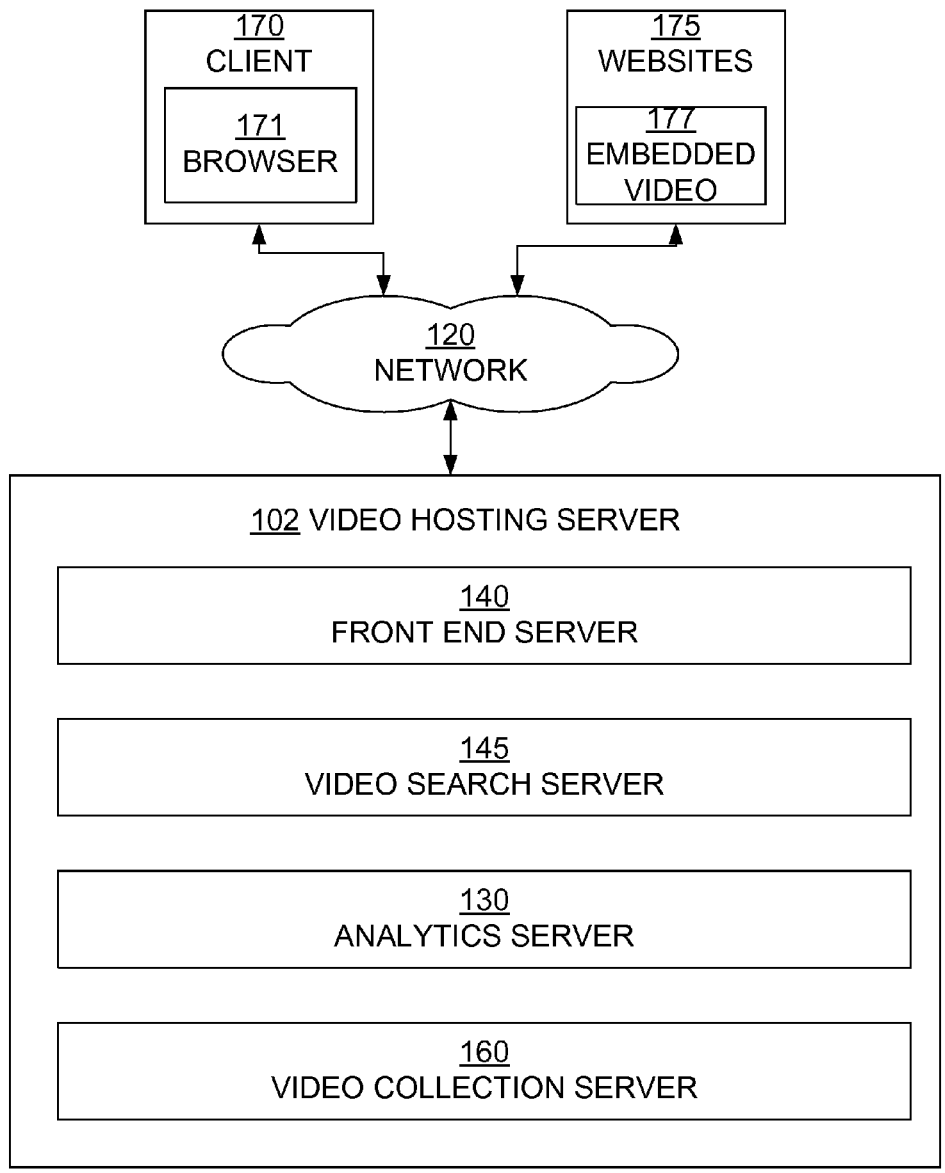
FIG. 1 is a block diagram of a system environment for presenting a visual representation of video usage statistics.

FIG. 1 is a block diagram of a system environment 100 for presenting a visual representation of video usage statistics. As shown in FIG. 1, a video hosting server 102 includes a front end server 140, a video search server 145, an analytics server 130, and a video collection server 160. The video collection server 160 includes a video server 310, an ingest server 320, a video database 330, a user database 340, and an activity log 350. More detail describing the video collection module is provided below in the description for FIG. 3.

Many conventional features, such as firewalls, load balancers, application servers, failover servers, site management tools, and so forth are not shown so as not obscure the features of the system. A suitable server 102 for implementation of the system is a server or servers of the YOUTUBE™ website, provided by Google Inc. of Mountain View, Calif. and found at www.youtube.com; other video hosting sites are known as well, and can be adapted to operate according the teaching disclosed here. In general, functions described in one embodiment as being performed on the server side can also be performed on the client side in other embodiments if appropriate. In addition, the functionality attributed to a particular component can be performed by different or multiple components operating together.

Each of the various servers is implemented as server program executing on server-class computer comprising a CPU, memory, network interface, peripheral interfaces, and other well-known components. The computers themselves in various embodiments run an operating system such as LINUX, Microsoft Windows, or Apple OS X, have generally high performance CPUs, 1 GB or more of memory, and 100 GB or more of disk storage. Of course, other types of computers can be used, and as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media) and accessed by the computer(s).

A client 170 executes a browser 171 such as Microsoft Internet Explorer or Mozilla Firefox, and connects to front end server 140 via a network 120, which is typically the Internet, but may also be any network, including but not limited to any combination of a LAN, a MAN, a WAN, a mobile, wired or wireless network, a private network, or a virtual private network. The network 120 represents communication pathways between the client 170, websites 175 and video hosting server 102. The network 120 can also utilize dedicated or private communications links that are not necessarily part of the Internet. In one embodiment, the network 120 uses standard communications technologies, protocols, and/or interprocess communications techniques. Thus, the network 120 can include links using technologies such as Ethernet, 802.11, integrated services digital network (ISDN), digital subscriber line (DSL), asynchronous transfer mode (ATM), etc. Similarly, the networking protocols used on the network 120 can include the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 120 can be represented using technologies and/or formats including the hypertext markup language (HTML), the extensible markup language (XML), etc. In addition, all or some of the links can be encrypted using conventional encryption technologies such as the secure sockets layer (SSL), HTTP over SSL (HTTPS), and/or virtual private networks (VPNs). In another embodiment, the nodes can use custom and/or dedicated data communications technologies instead of, or in addition to, the ones described above.

While only a single client 170 and browser 171 are shown, it is understood that very large numbers (e.g., millions) of clients are supported and can be in communication with the server 102 at any time. The browser 171 can include a video player (e.g., Flash™ from Adobe Systems, Inc.), or any other player adapted for the video file formats used in the server 102. A user can access a video from the server 102 by browsing a catalog of videos, conducting searches on keywords, reviewing playlists from other users or the system administrator (e.g., collections of videos forming channels), or viewing videos associated with particular user group (e.g., communities). A browser 171 can also access a video file indirectly, via an embedded video 177 that is accessed via an embedded hyperlink in a third party website 175. In various embodiments, server 102 can count views for a video that are either viewed directly on the video site and/or that are viewed via an embedded player. In one embodiment, a user can determine whether the displayed data covers views on the site, views via embedded players, or both.

Users of clients 170 can also search for videos based on keywords, tags or other metadata. These requests are received as queries by the front end server 140 and provided to the video search server 145, which then searches the video database 330 for videos that satisfy the queries. The video search server 145 supports searching on any fielded data for a video, including its title, description, tags, author, category, and so forth.

Users of the clients 170 and browser 171 can upload content (which can include, for example, video, audio, or a combination of video and audio) to server 102 via network 120. The uploaded content is processed by an ingest server 320 (FIG. 3), which processes the video for storage in the video database 330. This processing can include format conversion (transcoding), compression, metadata tagging, and other data processing. An uploaded content file is associated with the uploading user, and so the user's account record is updated in the user database 340 as needed.

The analytics server 130 processes information stored in the user database 340, video database 330, and activity log 350 of the video collection server 160 and generates visual representations of the processed data. The analytics server 130 includes a data analysis module 402 (FIG. 4), graph generation module 404, a map generation module 406, a chart generation module 408, a table generation module 410 and an interactivity module 412. Additional details describing the functionality of these modules are provided below in the description for FIG. 4.

Figure 2:
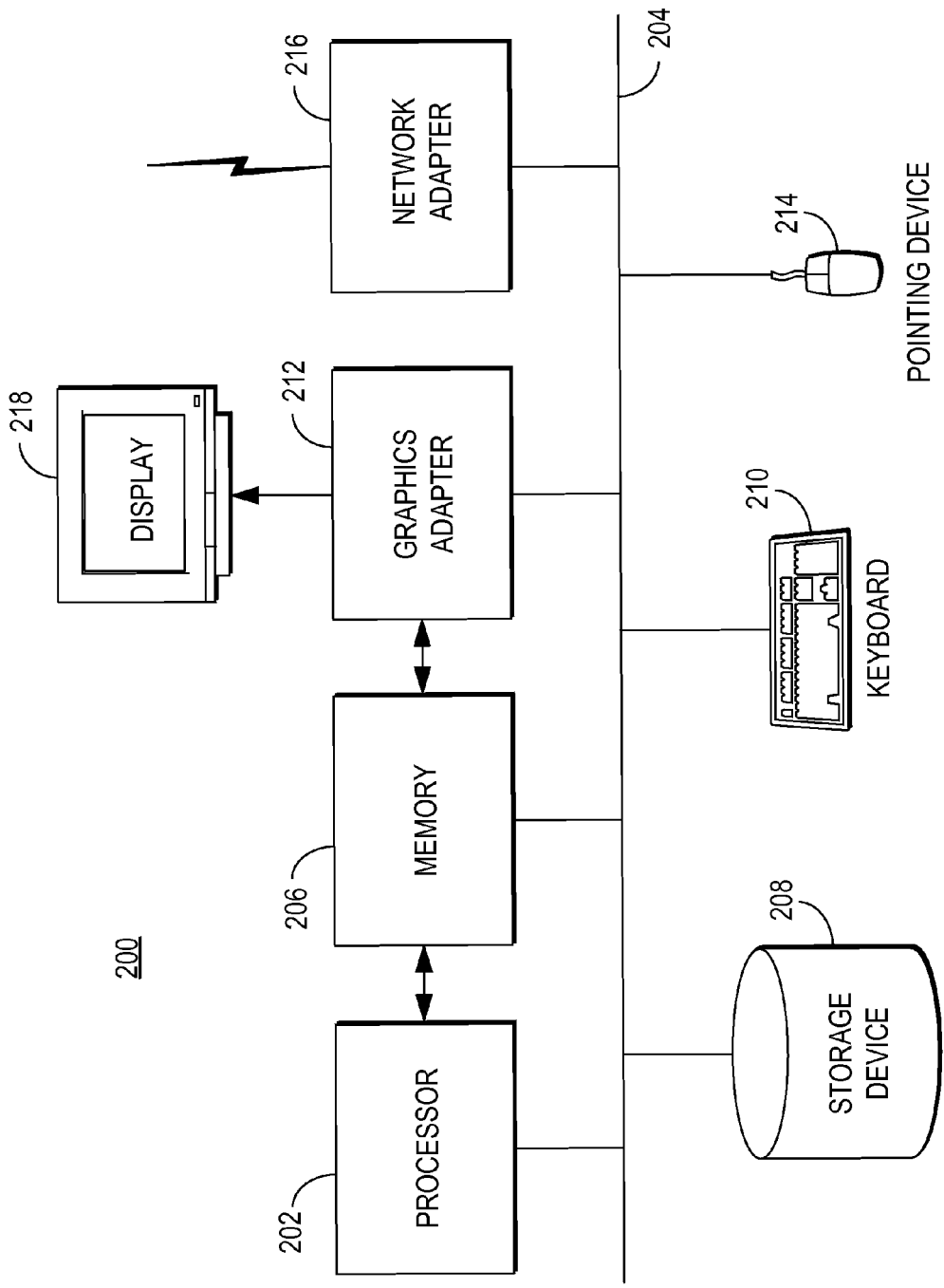
FIG. 2 is a block diagram illustrating a functional view of a typical computer for use as one of the entities illustrated in the environment of FIG. 1 according to one embodiment.

FIG. 2 illustrates a functional view of a typical computer 200 for use as one or more of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as those offered at present by Intel and AMD. The storage device 208 is any device capable of holding data, like a hard drive, compact disk read-only memory (CD-ROM), DVD, or a solid-state memory device. The memory 206 holds instructions and data used by the processor 202 and may be, for example, firmware, read-only memory (ROM), non-volatile random access memory (NVRAM), and/or RAM, and holds instructions and data used by the processor 202. The pointing device 214 may be a mouse, track ball, tablet, forger, or other type of pointing device, and is used in combination with the keyboard 210 (real or virtual, e.g., in the case of a mobile device) to input data into the computer system 200. The graphics adapter 212 displays images and other information on the display 218. The network adapter 216 couples the computer system 200 to the network 120.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202 as one or more processes.

The types of computers used by the entities of FIG. 1 can vary depending upon the embodiment and the processing power utilized by the entity. For example, the client 170 typically requires less processing power than the front end server 140, video search server 145, analytics server 130, and video collection server 160. Thus, the client 170 system can be a standard personal computer or a mobile telephone or PDA. The front end server 140, video search server 145, analytics server 130, and video collection server 160, in contrast, may comprise processes executing on more powerful computers, logical processing units, and/or multiple computers working together to provide the functionality described herein. Further, the front end server 140, video search server 145, analytics server 130, and video collection server 160 might lack devices that are not required to operate them, such as displays 218, keyboards 210, and pointing devices 214.

Embodiments of the entities described herein can include other modules than the ones described here. In addition, the functionality attributed to the modules can be performed by different modules in other embodiments. Moreover, this description frequently omits the term "module" for purposes of clarity and convenience.

Figure 3:
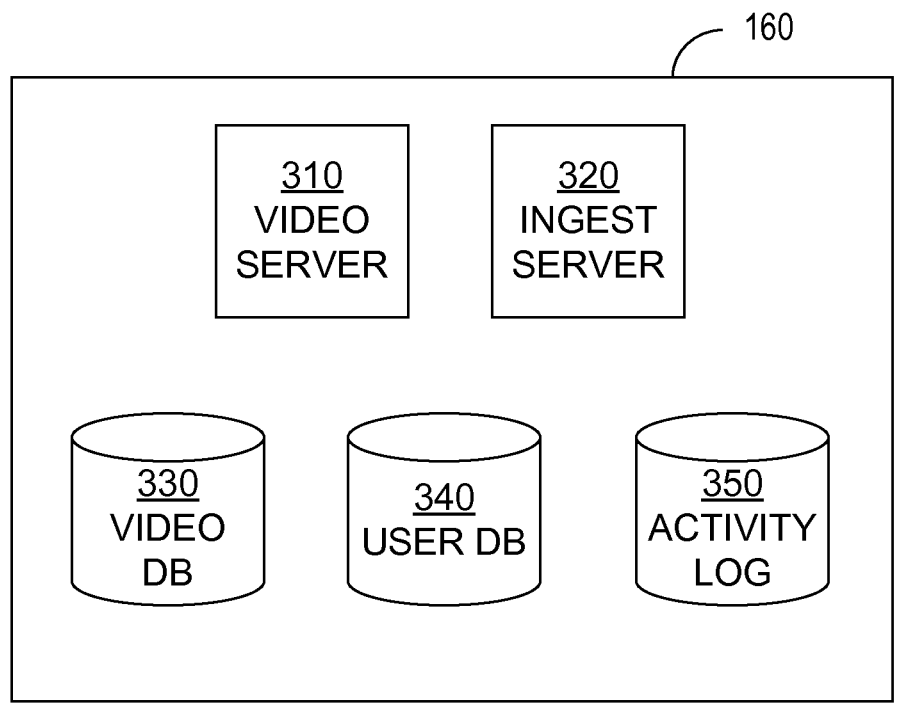
FIG. 3 is a block diagram illustrating modules within the video collection server according to one embodiment.

FIG. 3 is a block diagram illustrating modules within the video collection server 160 according to one embodiment. The video collection server 160 facilitates the collection and storage of user contributed videos. The server 160 includes a video server 310, an ingest server 320, a video database 330, a user database 340, and an activity log 350. The uploaded content is managed by the video server 310 and processed by ingest server 320. The ingest server 320 processes the video for storage in the video database 330. This processing can include format conversion, compression, metadata tagging, and other data processing. An uploaded content file is associated with the uploading user, and so the user's account record is updated in the user database 340 as needed. The video database 330 is adapted to store the ingested videos. The video database 330 stores video content and associated metadata, provided by their respective content owners. The video files can be encoded as H.263, H.264, WMV, VC-1 or the like; audio can be encoded as MP3, AAC, or the like. The files can be stored in any suitable container format, such as Flash, AVI, MP4, MPEG-2, RealMedia, DivX, etc. The metadata for each audio file may include an ISRC (or custom identifier), artist, song title, album, label, genre, time length, and geo-restrictions that can be used for data collection or content blocking on a geographic basis.

The user database 340 stores information associated with each uploading user. Information associated with a user includes information associated with a user's user identification (user ID), the user's login information or credentials, the user's residential location, the user's email address, a username, the user's country of residence, the user's date of birth, the user's gender, as well as other additional information related to the particular user. For example, in one embodiment, a list of videos that have been viewed by the user over the last ten days is associated with a user ID and is kept in the user database 340.

The activity log 350 stores information describing each access to any video by a user. This information includes a video identifier, user identifier, access type, start and stop times of the view, date of the view, and any other data useful for tracking individual or aggregate user behavior. The activity log 350 enables quantification of how much of each video users actually viewed, and thus how much each object of interest, whether product, logo, person or the like, was viewed.

The video database 330 is used to store the ingested videos. The video database 330 stores video content and associated metadata. The audio files can be encoded as mp3 files at 64 kbps, mono, 22.1 KHz, or better quality (e.g., 128 kbps, stereo, 44.2 KHz). The metadata for each audio files includes some or all of an ISRC (or custom identifier), artist, song title, album, label, genre, time length, and geo-restrictions that can be used for data collection or content blocking on a geographic basis.

For purposes of convenience and the description of one embodiment, the uploaded content will be referred to a "videos", "video files", or "video items", but no limitation on the types of content that can be uploaded are intended by this terminology. Each uploaded video is assigned a video identifier (id) when it is processed by the ingest server 320.

For purposes of illustration, FIG. 3 shows the video server 310, ingest server 320, video database 330, user database 340, and activity log 350 as discrete modules. However, in various embodiments, any or all of video server 310, ingest server 320, video database 330, user database 340, and activity log 350 can be combined. This allows a single module to perform the functions of one or more of the above-described modules.

Figure 4:
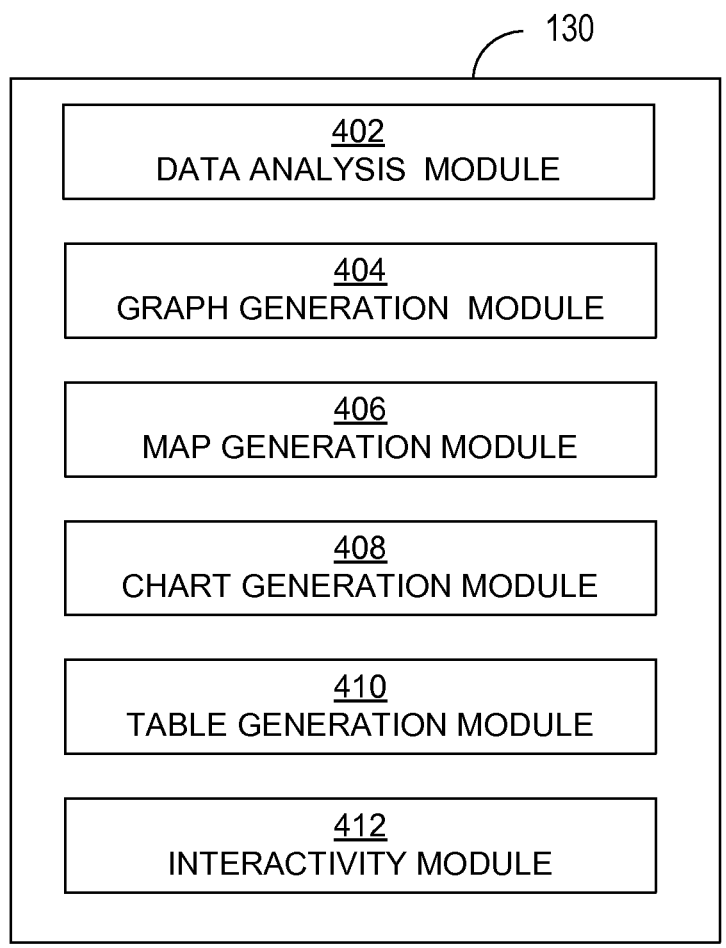
FIG. 4 is a block diagram illustrating modules within the analytics server according to one embodiment.

FIG. 4 is a block diagram illustrating modules within the analytics server 130 according to one embodiment. The analytics server 130 processes information stored in the user database 340 and video database 330 and generates visual representations of the processed data. As shown in FIG. 4, the analytics server 130 includes a data analysis module 402, graph generation module 404, a map generation module 406, a chart generation module 408, a table generation module 410 and an interactivity module 412.

The data analysis module 402 processes various types of information received from the user database 340 and video database 330. In some embodiments, the various types of information may be classified into different domains or types of data (data types).

An example of a type of data processed by the data analysis module 402 is information related to viewing of a particular video. In one embodiment, the data analysis module 402 processes the total number of views for each video in the video database. The data analysis module 402 further determines a total number of views from each of a plurality of geographic regions. In one embodiment, analysis module 402 determines the geographic location of a view from user account data in user database 340. Alternatively, the viewer's location can be determined from the IP address of the user. This allows inferences to be drawn about the popularity of a particular video in different regions of a country or of the world—for example, a video may be very popular in California, but very unpopular in New York; or popular in Russia but not popular in Australia. In various embodiments, data analysis module 402 further categorizes the views of the videos by time of day, day of week, or month of the year, and this further categorization can be performed both in the aggregate and by geographic region. For example, data analysis module 402 may identify that a particular video receives a large number of views from Canada close to 5:00 UTC, while the same video is most popular in South Africa at 14:00 UTC. One of many uses of such a metric is in load balancing and capacity planning. In one embodiment, the data analysis module 402 processes data associated with the playback length of the videos for each video and associates the data with the geographic region where the video was played. The playback length is the amount of time a particular video was watched by a particular user during one playing of the video, which is often less than the total length of the video. In one embodiment, the data analysis module 402 processes data associated with the average percentage of the video watched and associates the data with the geographic region where the video was watched.

In one embodiment, data analysis module 402 processes data associated with the viewing of a particular video and determines a popularity associated with the video. The popularity is calculated by comparing the number of views of the particular video to an average number of views of the videos in the video database 330. Tracking the portion of the video actually watched by the user allows data analysis module 402 to compare the video's ability to hold a viewer's attention compared to other videos of similar lengths, as described further below.

In one embodiment, information related to number of videos uploaded by a particular user is a type of data processed by the data analysis module 402. The data analysis module 402 determines the total number of videos uploaded for a particular user from the information stored in the user database 340. The data analysis module also determines the combined length of time of all of the videos uploaded by the user. In some embodiments, the data analysis module associates the uploaded videos with a geographic region.

In another embodiment, viewer demographics are analyzed and processed by the data analysis module 402. The data analysis module 402 analyzes the data stored about the viewing user in the user database 340 in order to process the viewer demographics. Viewer demographics may include the number of unique users who have viewed a particular video, age of the users, gender of the users, and other data associated with the users. The number of unique users may be determined, for example, by examining the number of unique cookies. The information associate with the user may be determined by examining the account information of the user.

In some embodiments, the data analysis module 402 processes information related to a viewer's reaction to a particular video. Such viewer reaction may be gleaned from what the viewer does with the video or whether the viewer has added commentary associated with the particular video. Some video hosting websites allow users and viewers of uploaded videos to engage with the community of users by providing their input on the uploaded video. Such input includes the ability to rate a particular video, provide text or video response comments, and add the video to a user's playlist of videos. In one embodiment, the data analysis module 402 processes a number of ratings associated with a particular video and associates the data with the geographic region of the rating origin. In one embodiment, the data analysis module 402 analyzes the number of comments posted for a particular uploaded video. The data analysis module 402 also associates the data associated with the number of comments with a geographic region where the comment originated and whether the comments were positive. In another embodiment, the data analysis module 402 analyzes the number of time a video has been added to users' lists of favorites or other playlists, which may additionally be broken down by geography. An overall measure of the user community's engagement with a particular video can be determined by rolling up individual users' ratings, favoriting and commenting on the video, as illustrated further below.

In one embodiment, the data analysis module 402 analyzes information related to how uploaded videos are found by viewers. This information may be determined by analyzing the data stored in the video database 330, user database 340, and/or activity log 350. For example, the data analysis module 402 determines whether the video was found on the video hosting website as a result of a query performed on the video hosting website, or whether a viewer was sent a link to view the video on the video hosting website, or whether the viewer arrived directly at the video, e.g., by directly requesting the URL associated with the video.

Some video hosting websites allow users to monetize their videos by displaying ads in conjunction with the video. In some embodiments, an image of the advertisement is displayed while the user-uploaded video is playing. In some embodiments, the image may be an animated image. In some embodiments, the advertisement may be a commercial that is played before the video is played, after the video is played, or at some point in time while the video is being played. In some embodiments, the advertisement may be displayed near of next to the video. In some embodiments, the advertisement may be displayed on a landing page containing search results including the video. The data analysis module 402 processes information related the earnings users are receiving for their videos. The data analysis module 402 determines which videos are displaying advertisements and how much money each video is earning. In some embodiments, the data analysis module 402 associates the identified videos displaying advertisements with a geographic location.

In some embodiments, the data analysis module 402 processes information related to the number of advertisements each advertiser is displaying on the user-uploaded videos. The data analysis module 402 determines which advertisers have the most advertisements being displayed and determines the amount of money spent by each advertiser. This determination allows a comparison to be made between the most amount of money spent and the least amount of money being spent by the advertisers.

Some video hosting websites allow selected videos to be promoted on the landing page of the video hosting website. In one embodiment, video promotion means that the video receives preferential treatment, such as preferential placement. These promoted videos can change over a certain period of time. In some embodiments, the data analysis module 402 processes information related to the videos being promoted. The data analysis module 402 identifies which videos are being promoted and associates those videos with a geographic location. In some embodiments, the data analysis module 402 identifies which videos are being promoted and associates those videos with a geographic location of the origin of the videos. In some embodiments, the data analysis module 402 also determines how many times a promoted video has been promoted.

Some video hosting websites categorize videos by defined channels. In some embodiments, the data analysis module 402 analyzes the viewing activity of these channels. In one embodiment, the data analysis module 402 processes the total number of views for each channel on the video hosting website. The data analysis module 402 associates the total number of views with the geographic region in which the views occurred. In one embodiment, data analysis module 402 processes data associated with the viewing of a particular channel and also determines a popularity associated with the channel. The popularity is calculated by comparing the number of views of the particular channel to an average number of views of the channels on the video hosting website.

Figure 7:
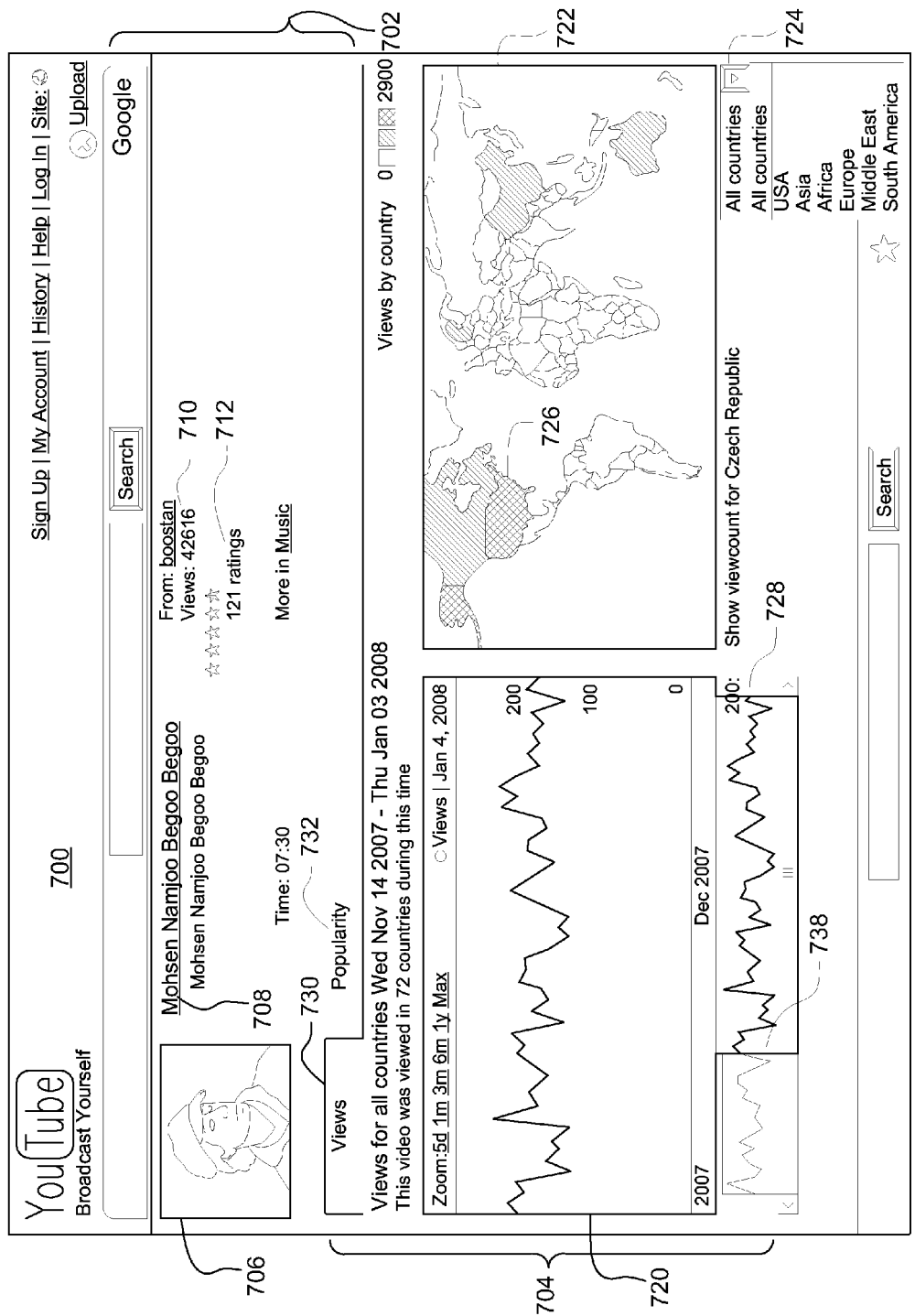
FIG. 7 is an exemplary web page showing visual presentation of video usage statistics according to one embodiment.

The graph generation module 404 receives the processed data from the data analysis module 402 and generates a graphical representation of the processed data. In some embodiments, the graphical representation is in the form of a timeline similar to the one illustrated in, for example, FIG. 7. The timeline represents the trend of the processed data over a certain period of time. For example, when the processed data associated with the number of views of a particular video is analyzed, a timeline is generated to show the trend of the number of views of the particular video over a certain period of time. In some embodiments, the graph generation module 404 generates a graph that is modifiable. For example, the graph generation module 404 generates a graph that allows a user to adjust the period of time shown on the graph. As shown in FIG. 7, a user may move the vertical line 738 of the sliding area 728 to adjust the size of the sliding area 728. The adjustment made to the sliding area 728 results in a modification to the period of time shown on the timeline graph 720.

The map generation module 406 receives the processed data from the data analysis module 402 and generates a geographic map associated with the processed data. In some embodiments, the map is a world map and shows all or many of the countries in the world as seen in FIG. 7. In some embodiments, the map generation module 406 generates a selectable map. The generated map is selectable such that when a user selects a continent on the map, the view of the map changes to display only the continent and existing countries. In some embodiments, the map of the continent is selectable such that a user can select a particular country on the map. In such embodiments, when the user selects the country, the view of the map changes to display only the country and existing states. In some embodiments, the country map is also selectable allowing a user to select a particular state. In some embodiments, the map generation module 406 also generates a pull-down menu that allows a user to select the countries shown in the map. An example of such pull-down menu 724 is shown in FIG. 7. For example, when a world map is generated, a pull-down menu such as the one shown in FIG. 7 is also generated. The pull-down menu allows the user to select a particular continent for display.

In some embodiments, the map generation module 406 receives the processed data from the data analysis module 402 and generates a geographic map associated with the processed data where the information regarding the processed data is represented by variation in color or shading on the geographic map. For example, as seen in the geographic map 722 of FIG. 7, a darker shade is assigned to a country 726 with many views, while a lighter shade is assigned to countries 728 with fewer views, and no shading is assigned to countries with no views for the selected timeframe In some embodiments, if the user then selects a geographic region, the views are shown on the first representation for the newly selected geographic region and the selected timeframe. Some embodiments allow the user to set a window day-part portion, for example, showing only views between 9:00 AM and 5:00 PM. The chart generation module 408 receives the processed data from the data analysis module 402 and generates a graphical representation of the processed data in the form of a chart. In some embodiments, the chart is a pie chart such as the one shown in FIG. 11. In some embodiments, the charts generated by the chart generation module 408 are selectable. The generated chart is selectable such that when a user selects an area on the chart, the selected area is highlighted.

The table generation module 410 receives the processed data from the data analysis module 402 and generates a graphical representation of the processed data in the form of a table.

The graphs, maps, charts, and tables generated by modules 404, 406, 408, and 410 are all graphical representations of the processed video data. In some embodiments, the analytics server generates two graphical representations and sends the two graphical representations for display on a client device 170. In such embodiments, the interactivity module 412 ensures that a modification to one graphical representation by a user of the client device 170 modifies the other graphical representation. The steps performed by the interactivity module 412 are provided below in the description for FIG. 6.

Figure 5:
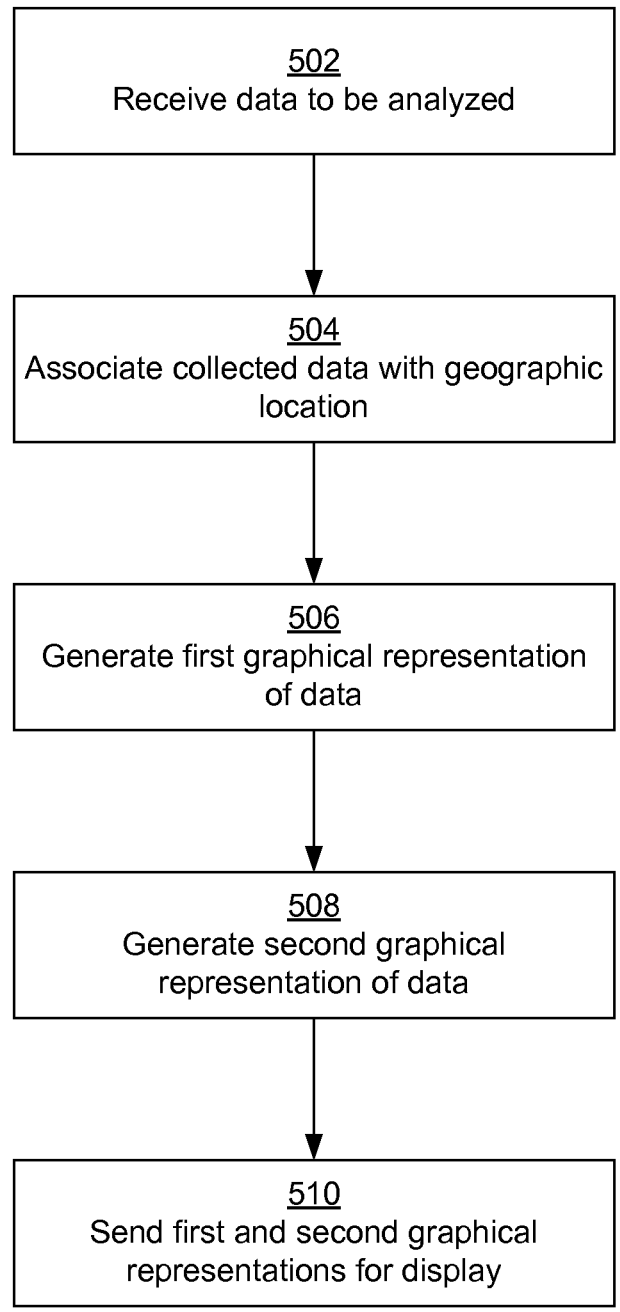
FIG. 5 is a flow chart illustrating steps performed by the analytics server according to one embodiment.

FIG. 5 is a flow chart 500 illustrating steps performed by the analytics server 130 according to one embodiment. The analytics server 130 receives 502 video data from the video database 330, user database 340, and activity log 350 of the video collection server 160. The data analysis module 402 of the analytics server 130 processes the received video data and associates 504 the processed data with a geographic region of the viewers of the video. The analytics server via the graph generation module 404, map generation module 406, chart generation module 408, or table generation module 410 generates 506 a first graphical representation of the data. The analytics server via the graph generation module 404, map generation module 406, chart generation module 408, or table generation module 410 also generates 508 a second graphical representation of the data. The first graphical representation and second graphical representation are sent 510 for display on a client device 170.

Figure 6:
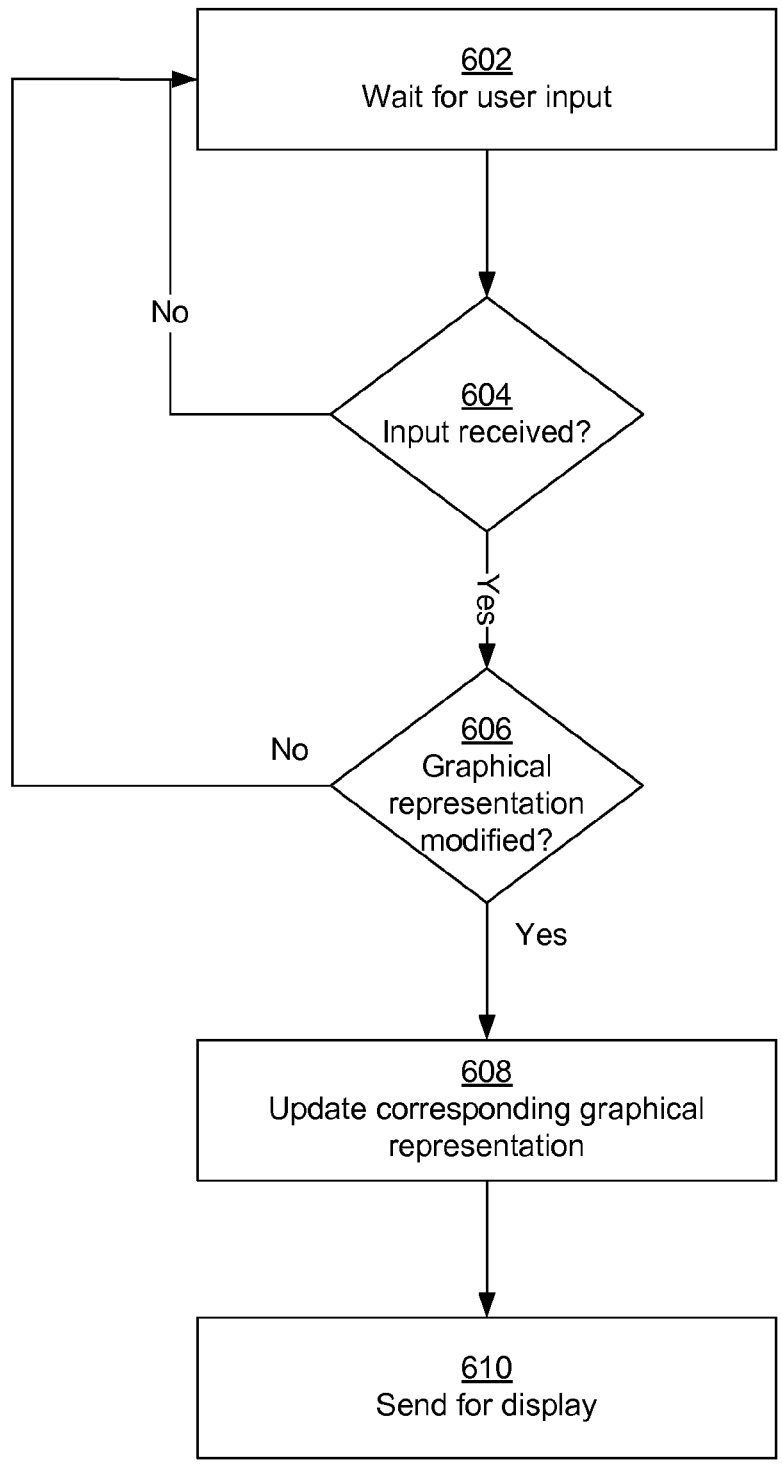
FIG. 6 is a flow chart illustrating additional steps performed by the analytics server according to one embodiment.

FIG. 6 is a flow chart illustrating additional steps performed by the analytics server 130 according to one embodiment. The analytics server 130 waits 602 for a user input. In some embodiments, the user input is a user selection of an area of the first or second graphical representation generated by the analytics server 130 and displayed on a client 170. If a user input has not been received (604-No), the server 130 continues to wait 602 for a user input. If a user input is received (604-yes), a determination 606 is made as to whether the selected area has modified the graphical representation. If the graphical representation has not been modified (606-No), the server 130 waits 602 for another user input. If the graphical representation has been modified (606-Yes), the analytics server 130 updates 608 the corresponding graphical representation and sends 610 the updated graphical representation for display.

Referring again to FIG. 7, an exemplary web page 700 shows visual presentation of video usage statistics according to one embodiment. In one embodiment, this web page 700 is generated by the video hosting server 102. In some embodiments, the web page 700 is generated when a user logs into the user's account and selects a link to display information about a particular video that the user has uploaded.

The page 700 is separated into a video information region 702 and video statistics region 704. The video information region 704 includes a video icon 706, a video title 708, and additional information about the video, such as the number of views 710 and ratings 712. The video statistics region 704 includes a first graphical representation 720 and a second graphical representation 722. The first graphical representation 720 shows the data processed by the data analysis server 402 and the second graphical representation shows the corresponding data in a different graphical representation. A user can select and modify both the first graphical representation 720 and second graphical representation 722. When the user makes a selection and modifies the first graphical representation 720, the second graphical 722 representation is updated to display the corresponding data.

In one embodiment, as shown in FIG. 7, the first graphical representation 720 is a timeline graph and the second graphical representation 722 is a geographic map. The timeline graph 720 shows the number of views of the video within a certain time frame. The geographical map 722 shows the geographic region that corresponds to the view information represented by the timeline graph 720. In the example shown in FIG. 7, the view information corresponds to the views by users worldwide. Different colors or shading indicate the relative frequency of the metric being described—in this case, views by country. In the illustrated case, the United States has the darkest shading, followed by Canada, and then by several European countries (Germany, France, the UK and Sweden), Iran, and then finally by the rest of the world. This indicates that the video is most popular in the United States, of less popularity in the lighter-shaded countries, and least popular in the remaining countries. A legend indicates that the darkest shading represents 2900 views in that country.

Figure 8:
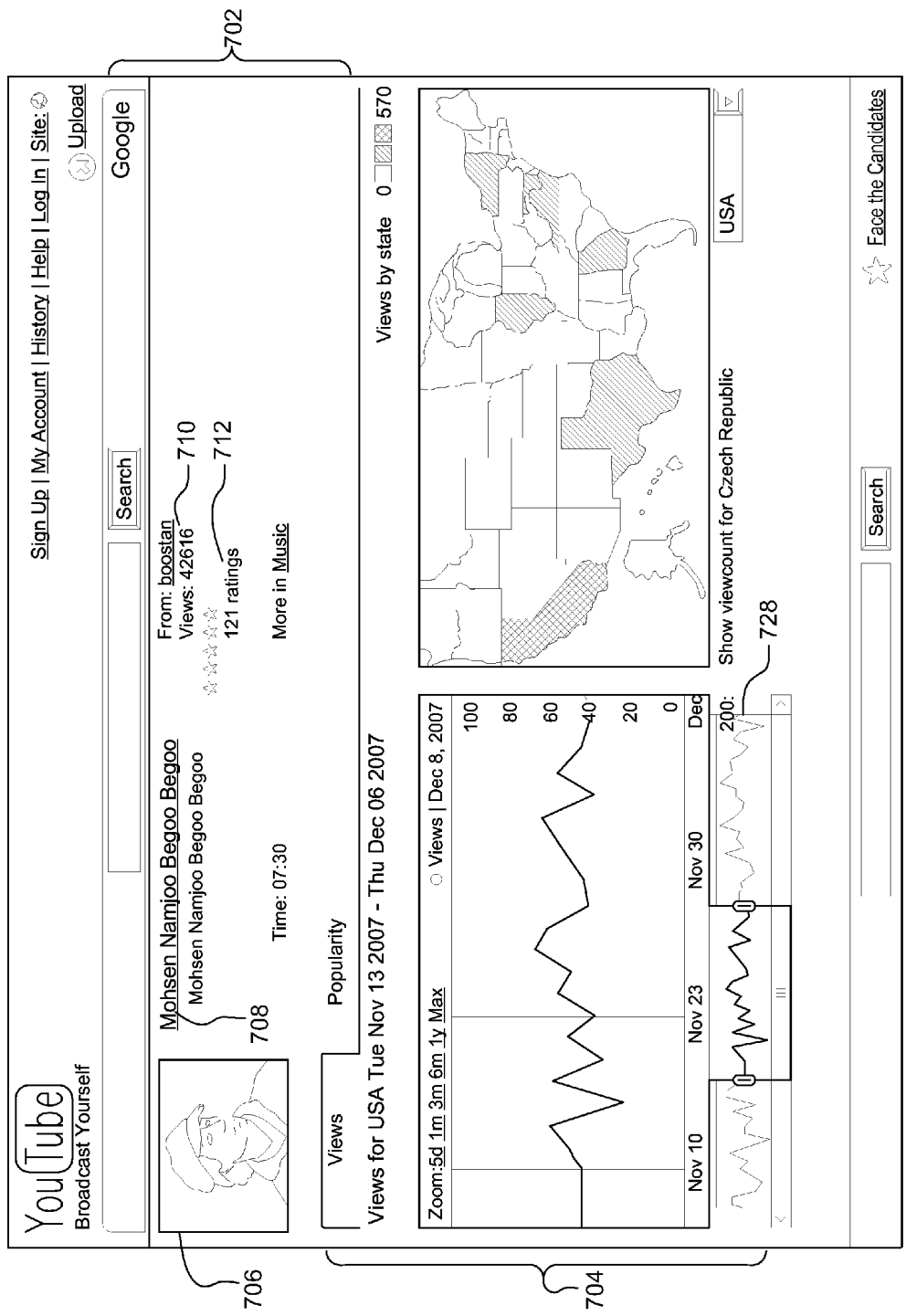
FIG. 8 is an exemplary web page showing visual presentation of video usage statistics according to another embodiment.

A user can adjust the time frame displayed on the timeline graph 720 by sliding the adjustable sliding area 728. A user can also select on an area within the geographical map 722. For example, as shown in FIG. 1, a user can select a particular country 726 within the geographical map 722. When the user makes the selection, the video statistics region 704 is updated to show an updated first graphical representation 720 and second graphical representation 722, as shown in FIG. 8. In this example, page 700 of FIG. 8 continues to display the video information region, which includes a video icon 706, a video title 708, and additional information about the video, such as the number of views 710 and ratings 712. The video statistics region 704 shows an updated timeline graph 720 and geographical map 722. Here, the view information shown in the updated timeline graph 720 corresponds to the view information from views in the United States, and indicates that California is responsible for the most views—570 in the illustrated case.

Figure 9:
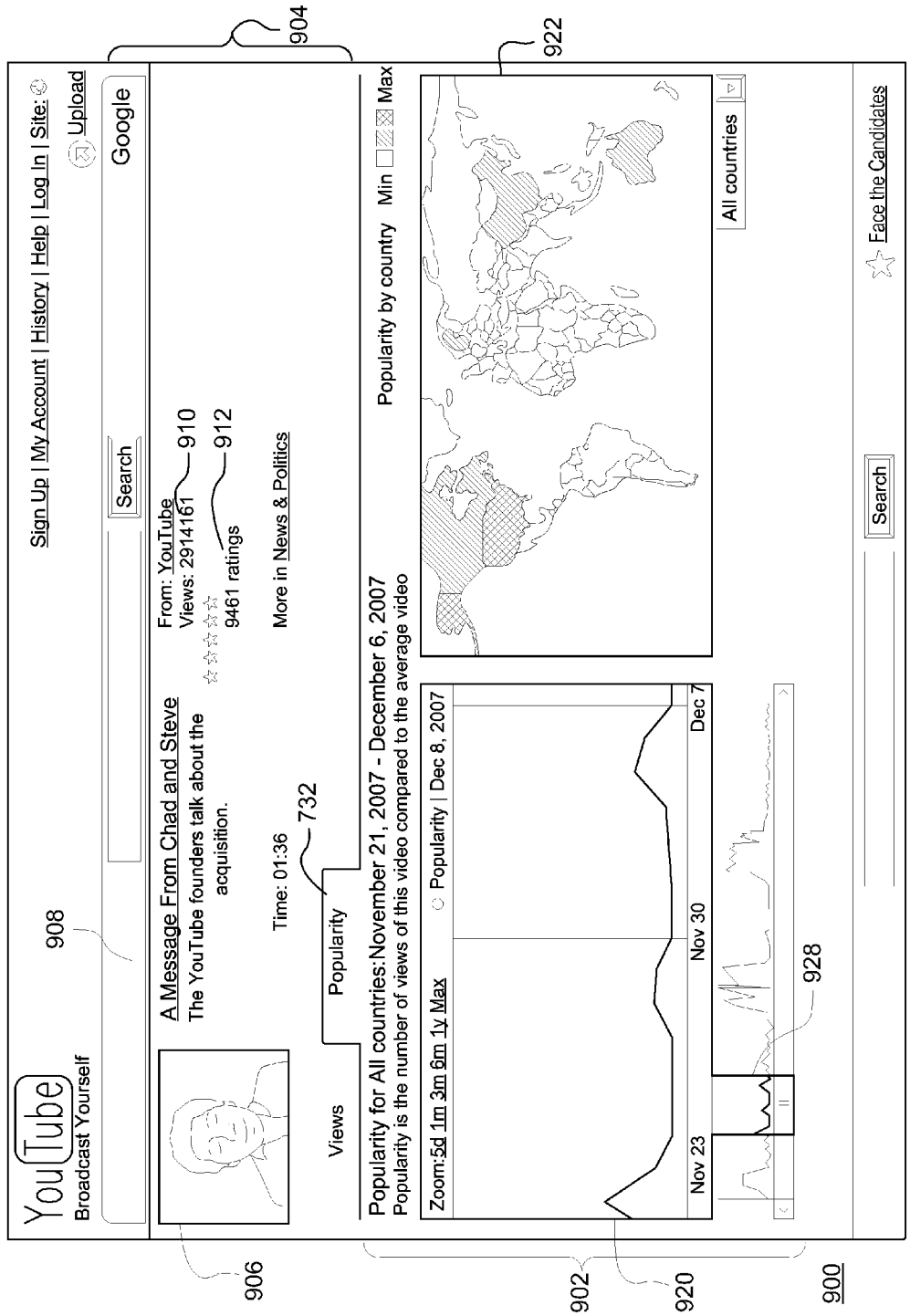
FIG. 9 is an exemplary web page showing visual presentation of video usage statistics according to another embodiment.
Figure 10:
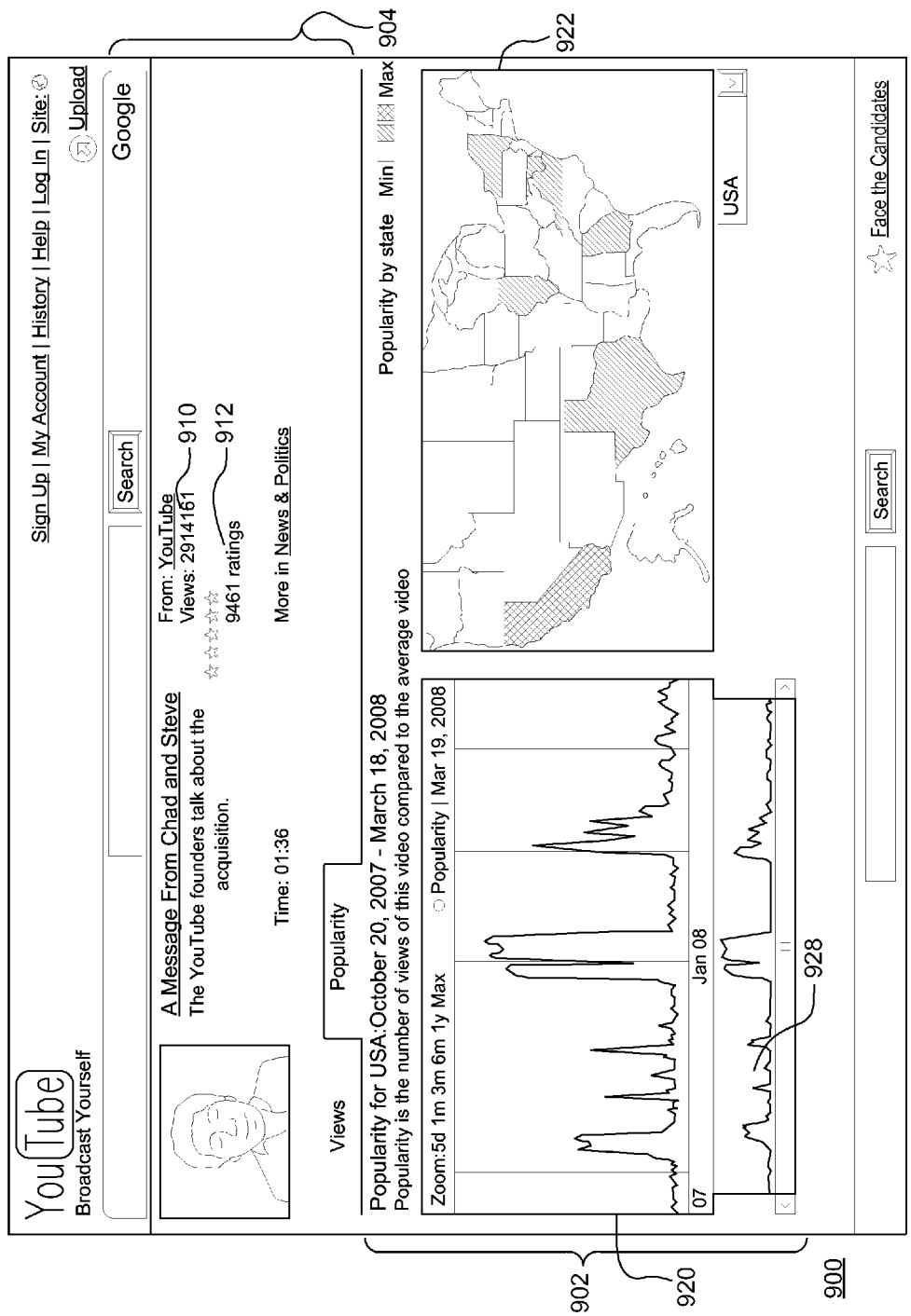
FIG. 10 is an exemplary web page showing visual presentation of video usage statistics according to another embodiment.

In some embodiments, the video information region 704 includes data display tabs 730 and 732 (FIG. 7). The display tabs 730,732 are selectable. When a user selects a display tab, corresponding information is displayed in the video information region 704. As shown in FIG. 7, view display tab 730 indicates that the information in the graphical representations 720 and 722 are currently showing information corresponding to view information about the video. If a user selects the popularity data tab 732, the video information region 704 is updated to display popularity information about the video, as shown in FIGS. 9 and 10. Popularity in this case is the number of views of a video compared to the average number of views a video receives.

FIG. 9 is an exemplary web page showing visual presentation of video usage statistics according to another embodiment. In one embodiment, this web page 900 is generated by the video hosting server 102. In some embodiments, the web page 900 is generated when a user logs into the user's account and selects a link to display information about a particular video that the user has uploaded.

Similar to page 700, page 900 is also separated into a video information region 904 and video statistics region 902. The video information region 904 includes a video thumbnail 906, a video title 908, and additional information about the video, such as the number of views 910 and ratings 912. The video statistics region 902 includes a first graphical representation 920 and a second graphical representation 922. The first graphical representation 920 shows the data processed by the data analysis server 402 and the second graphical representation 922 shows the corresponding data in a different graphical representation. A user can select and modify both the first graphical representation 920 and second graphical representation 922. When the user makes a selection and modifies the first graphical representation 920, the second graphical representation 922 is updated to display the corresponding data.

In the example shown in FIG. 9, the timeline graph 920 shows the number of views of the video within a certain time frame. The geographical map 922 shows the geographic region that corresponds to the popularity information represented by the timeline graph 920. In the example shown in FIG. 9, the popularity information corresponds to the popularity of the videos as watch by users worldwide, with the video being most popular in the United States, but also popular in Sweden, China, Australia and additional parts of Asia and Africa. In one embodiment, Popularity for purposes of graphing is a relative measure between 0 and 100 of how the views for this video compare to views for all other videos.

Similar to page 700, a user can adjust the time frame displayed on the timeline graph 920 by sliding the adjustable sliding area 928. A user can also select an area within the geographical map 922. For example, as shown in FIG. 9, a user can select a particular country within the geographical map 922. When the user makes the selection, the video statistics region 902 is updated to show an updated first graphical representation 920 and second graphical representation 922, as shown in FIG. 10. In this example, page 900 of FIG. 10 continues to display the video information region 904, and the video statistics region 902 shows an updated timeline graph 920 and geographical map 922. Here, the view information shown in the updated timeline graph 920 corresponds to the view information from views in the United States, segmented by state, as shown in the second graphical representation 922 of FIG. 10.

Figure 11:
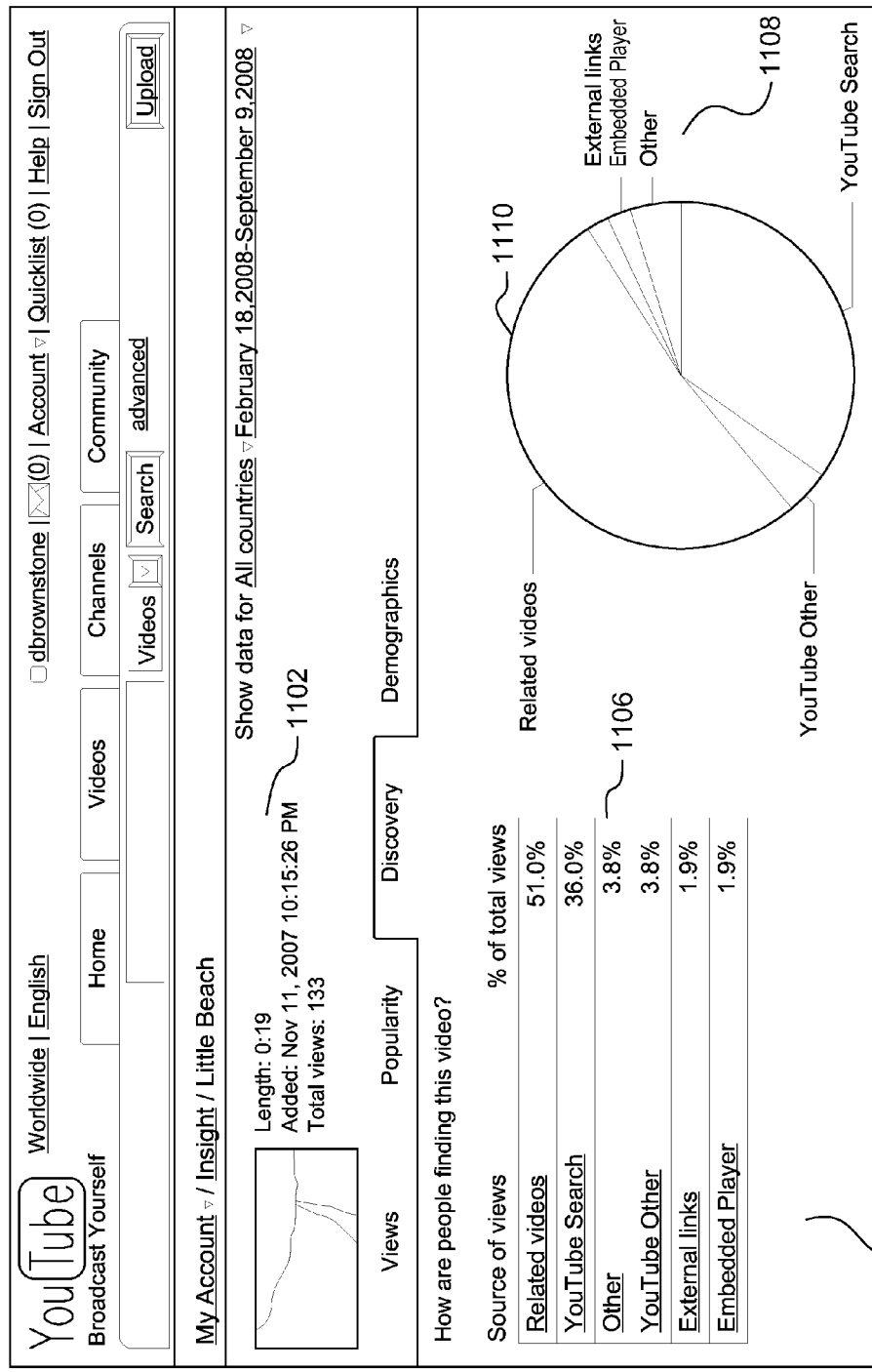
FIG. 11 is an exemplary web page showing visual presentation of video usage statistics according to another embodiment.

In some embodiments, the video statistics region includes additional data tabs. FIG. 11 is an exemplary web page showing visual presentation of video usage statistics according to another embodiment. In one embodiment, this web page 1100 is generated by the video hosting server 102. In some embodiments, the web page 1100 is generated when a user logs into the user's account and selects a link to display information about a particular video that the user has uploaded.

Page 1100 is also separated into a video information region 1102 and video statistics region 1104. The video information region 1102 includes a video icon, a video title, and additional information about the video, such as the number of views and length of the video. The video statistics region 1104 includes a first graphical representation 1106 and a second graphical representation 1108. The first graphical representation shows the data processed by the data analysis server and the second graphical representation shows the corresponding data in a different graphical representation. A user can select and modify both the first graphical representation and second graphical representation. When the user makes a selection and modifies the second graphical representation, the first graphical representation is updated to display the corresponding data.

Figure 12:
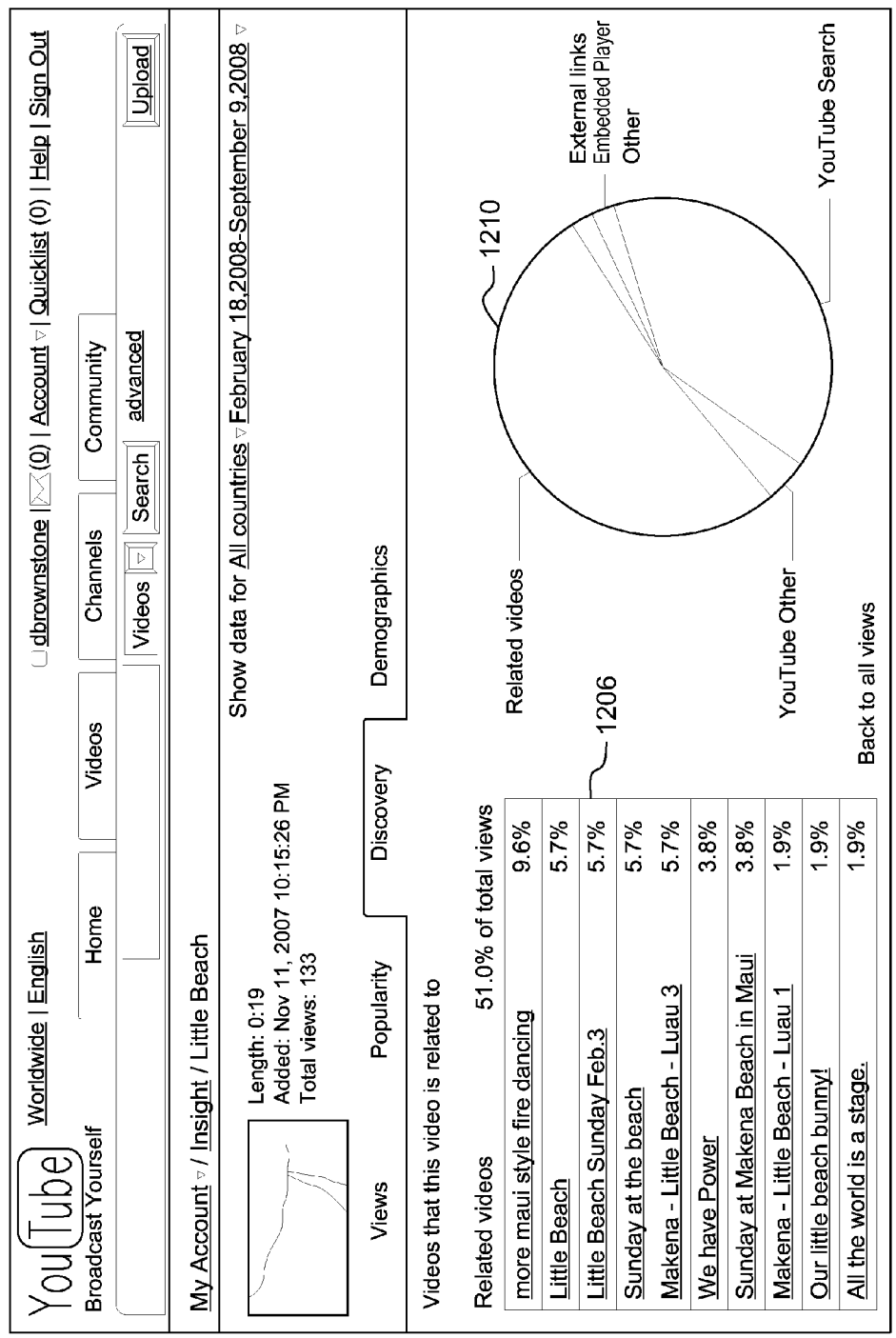
FIG. 12 is an exemplary web page showing visual presentation of video usage statistics according to another embodiment.

Here, the first graphical representation and second graphical representation show data associated with how the video was discovered by the viewers of the video. The first graphical representation 1106 is a table and the second graphical representation 1108 is a pie chart. A user can select an area on the pie chart and the data displayed on the table is updated accordingly as shown in FIG. 12. For example, in FIG. 11, the pie chart indicates (as shown in the table) that 51% of viewers found the video in question by first viewing a related video. If the user clicks on the "Related videos" section 1110 of the pie chart, the display is updated as illustrated in FIG. 12. In FIG. 12, the "related videos" section 1210 of the pie chart is highlighted to show it has been selected. The table in region 1206 is also updated accordingly to illustrate which related videos comprise the 51% illustrated in the pie chart. Other sections of the pie chart illustrate video discovery via external links, embedded players, searches conducted on the video hosting server 102, and an section for other discovery methods. While a pie chart is illustrated here, a bar chart or any suitable type of chart may be used.

Figure 13:
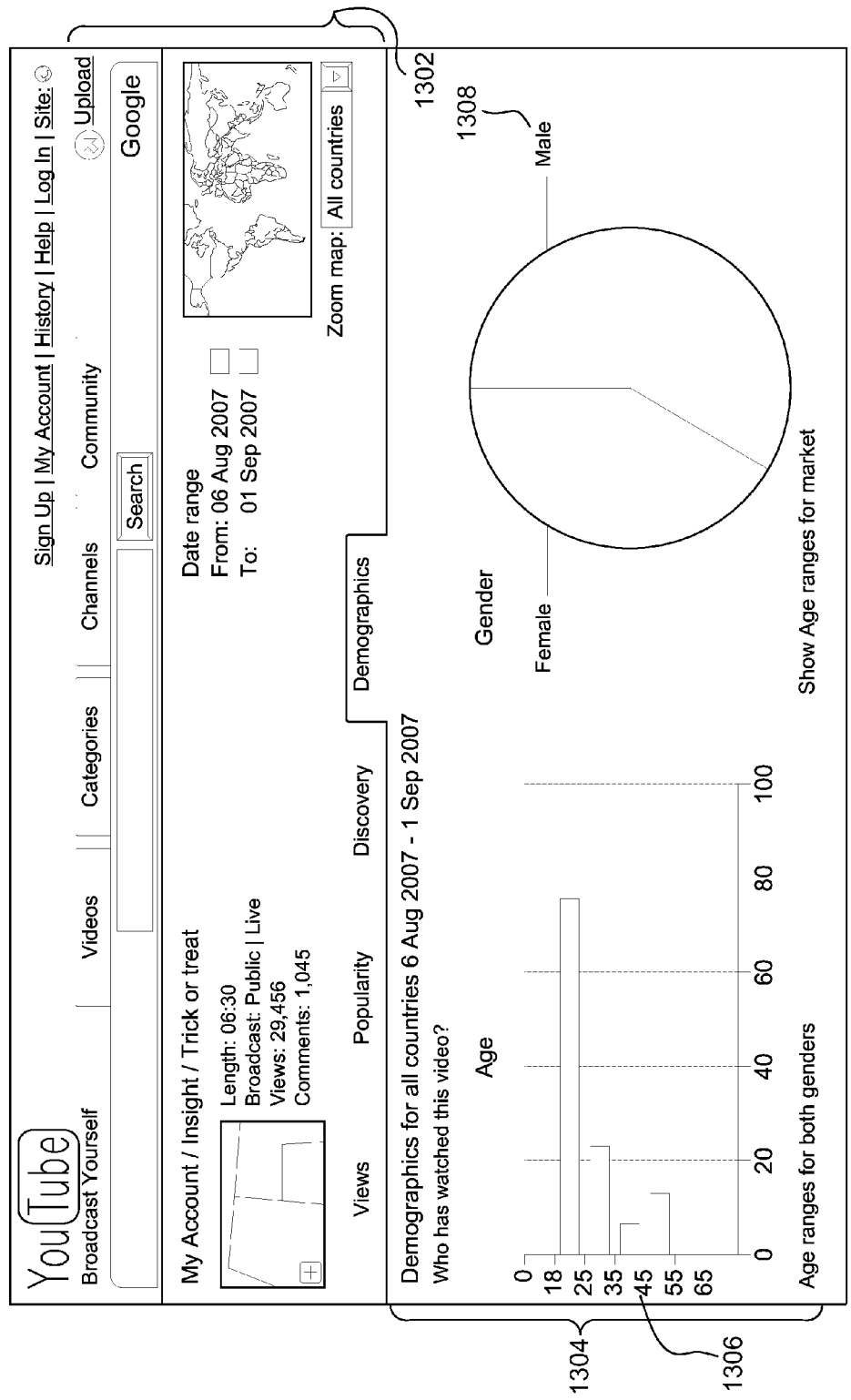
FIG. 13 is an exemplary web page showing visual presentation of video usage statistics according to another embodiment.

FIG. 13 is an exemplary web page 1300 showing visual presentation of video usage statistics according to another embodiment. In some embodiments, the web page 1300 is generated when a user selects the Demograhpics tab of page 1100.

Page 1300 is also separated into a video information region 1302 and video statistics region 1304. The video information region includes a video icon, a video title, and additional information about the video, such as the number of views and length of the video. The video statistics region includes a first graphical representation 1306 and a second graphical representation 1308. The first graphical representation 1306 shows the data processed by the data analysis module 402 and the second graphical representation shows the corresponding data in a different graphical representation. A user can select and modify both the first graphical representation and second graphical representation. When the user makes a selection and modifies the second graphical representation, the first graphical representation is updated to display the corresponding data.

Figure 14:
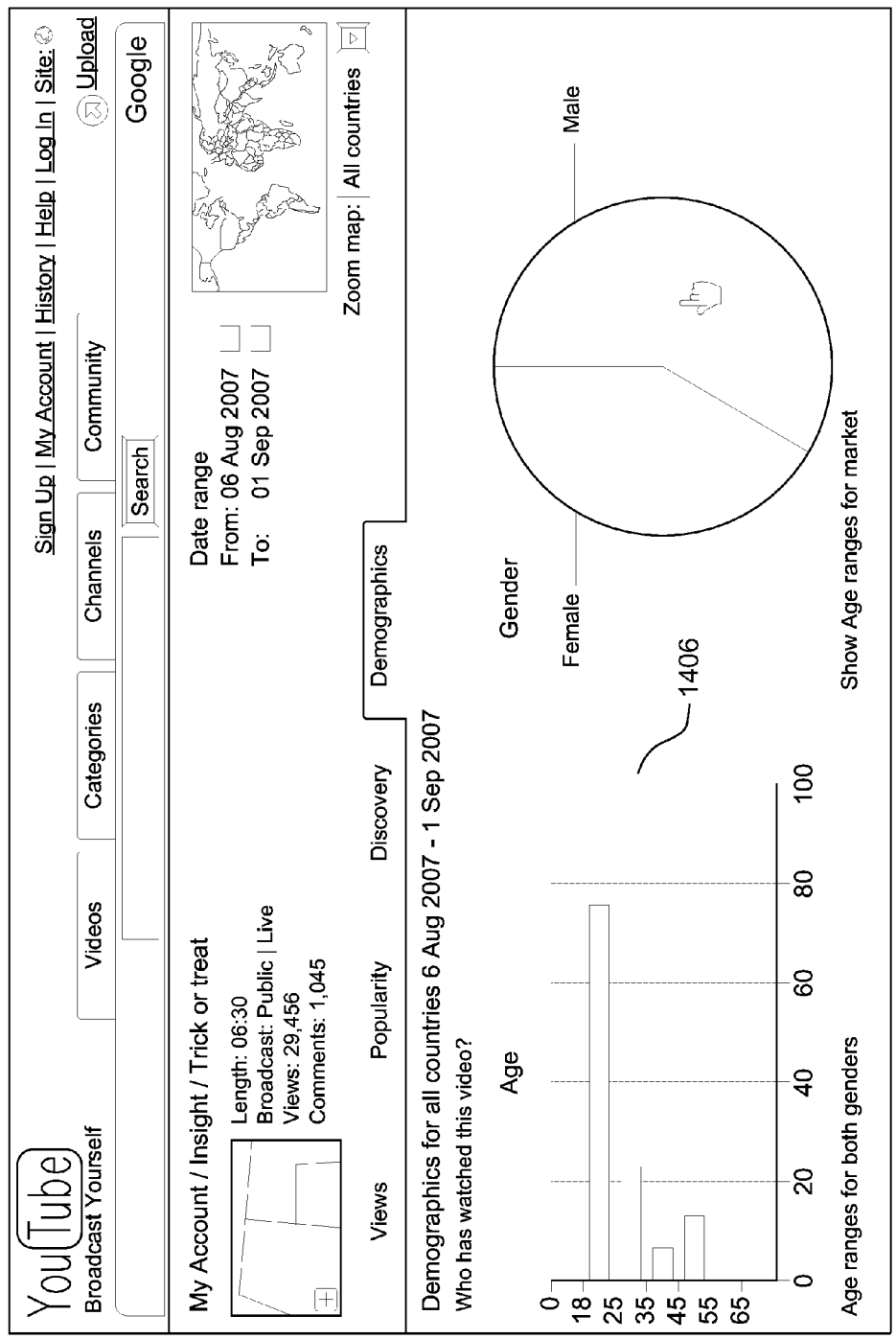
FIG. 14 is an exemplary web page showing visual presentation of video usage statistics according to another embodiment.

Here, the first graphical representation and second graphical representation show data associated with the demographics of the viewers of the video. Region 1308 includes a pie chart showing the representation of males versus females among the viewers. Region 1306 presents in the information in tabular data. Selecting one of the sections of the pie chart causes the tabular data in region 1306 to be updated to show data related to the selected section only, e.g., male viewers only or female viewers only. This is illustrated in FIG. 14, where only the male viewership's ages are illustrated in region 1406.

Figure 15:
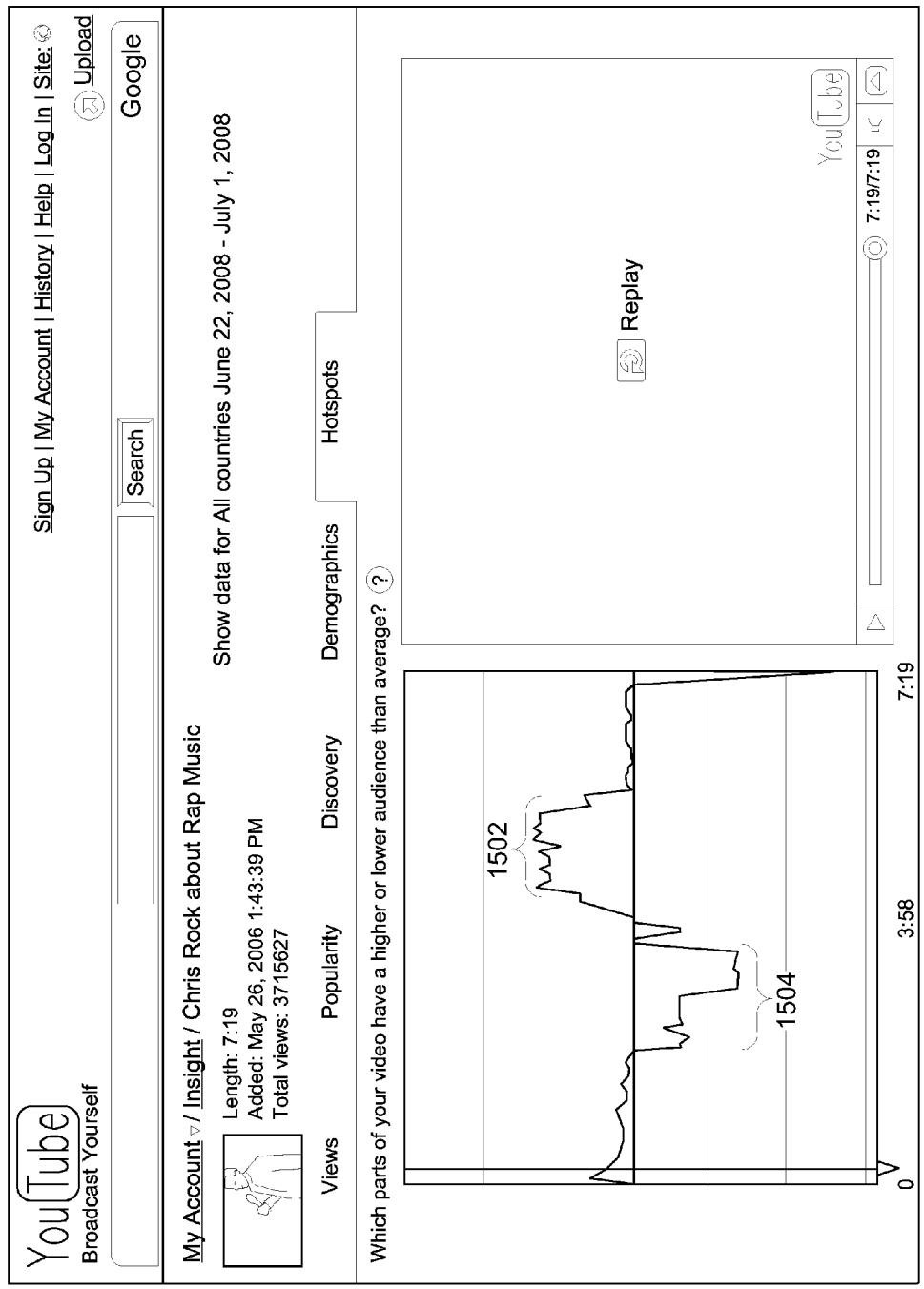
FIG. 15 is an exemplary web page showing visual presentation of video usage statistics including popularity of portions of a video according to one embodiment.

Another video usage statistic of interest is which portions of a video are most and least popular compared to videos of similar length. In one embodiment, data analysis module 402 determines this information by analyzing data about when a viewer stops playback of the video, for example by clicking on another video or otherwise navigating away from the page. In another embodiment, an example of which is illustrated in FIG. 15, data analysis module 402 analyzes which portions of a video are watched more frequently than average. For example, the portion of the video occurring just past the mid-way mark, that is, region 1502, is more popular than similar portions of average videos. This could be the result, for example, of viewers rewinding and watching that section of the video multiple times. Other regions such as region 1504 indicate a less popular than average portion of the video, suggesting for example that viewers may skip ahead and not watch that portion of the video.

Figure 16:
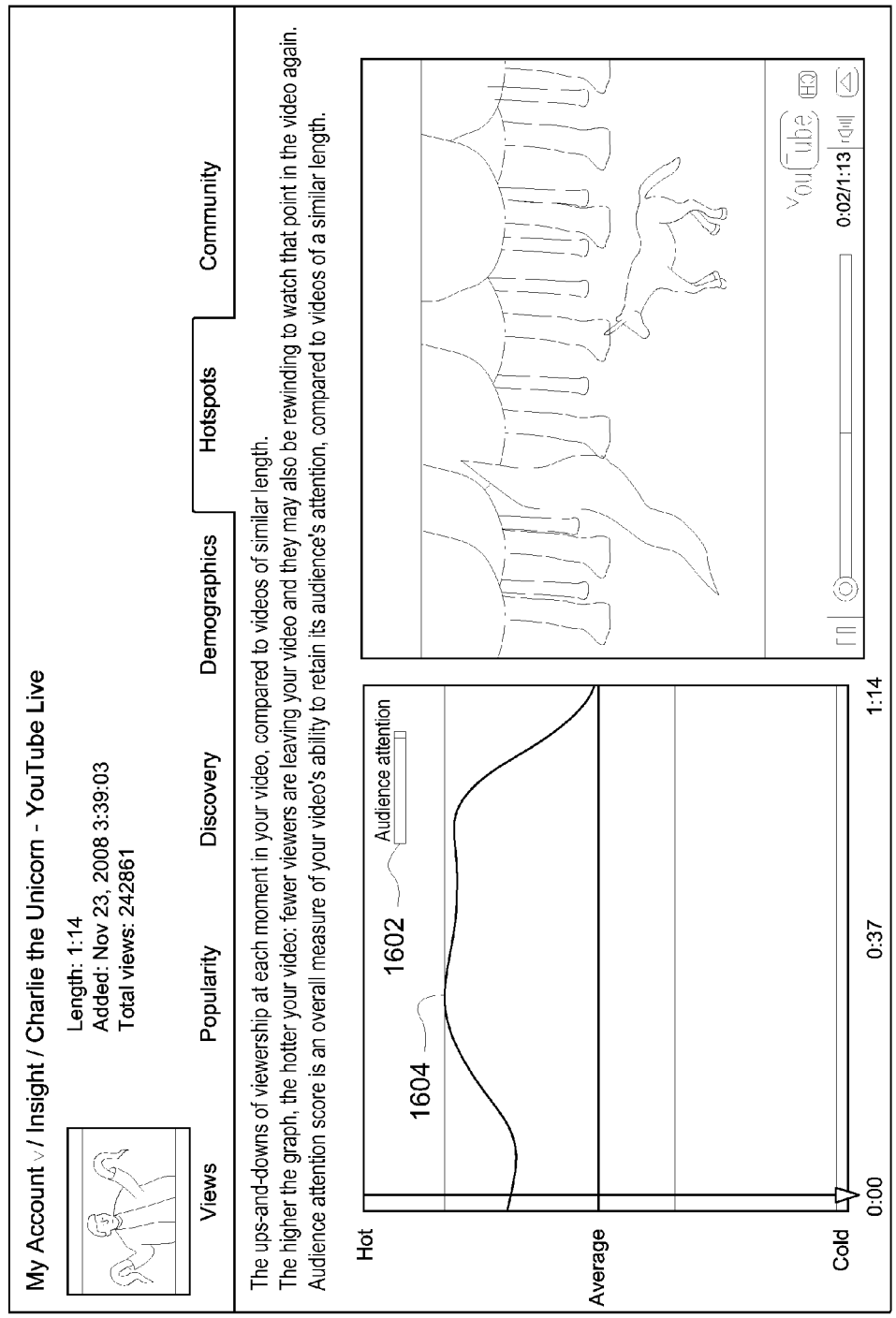
FIG. 16 is an exemplary web page showing an audience attention metric in accordance with an embodiment of the present invention.

FIG. 16 illustrates an additional embodiment in which data analysis module 402 analyzes portions of a video to determine whether they are watched more frequently or less frequently than average. In FIG. 16, graphic 1602 indicates audience attention, which is a score that is an overall measure of the video's ability to retain its audience's attention, compared to videos of a similar length. In the illustrate case, the audience attention is high, which signifies that the "Charlie the Unicorn" video tends to hold its audience's attention very well compared to other videos. This is consistent with the curve 1604 showing viewership across various time segments of the video, which is above average for the entire length of the video.

Figure 17:
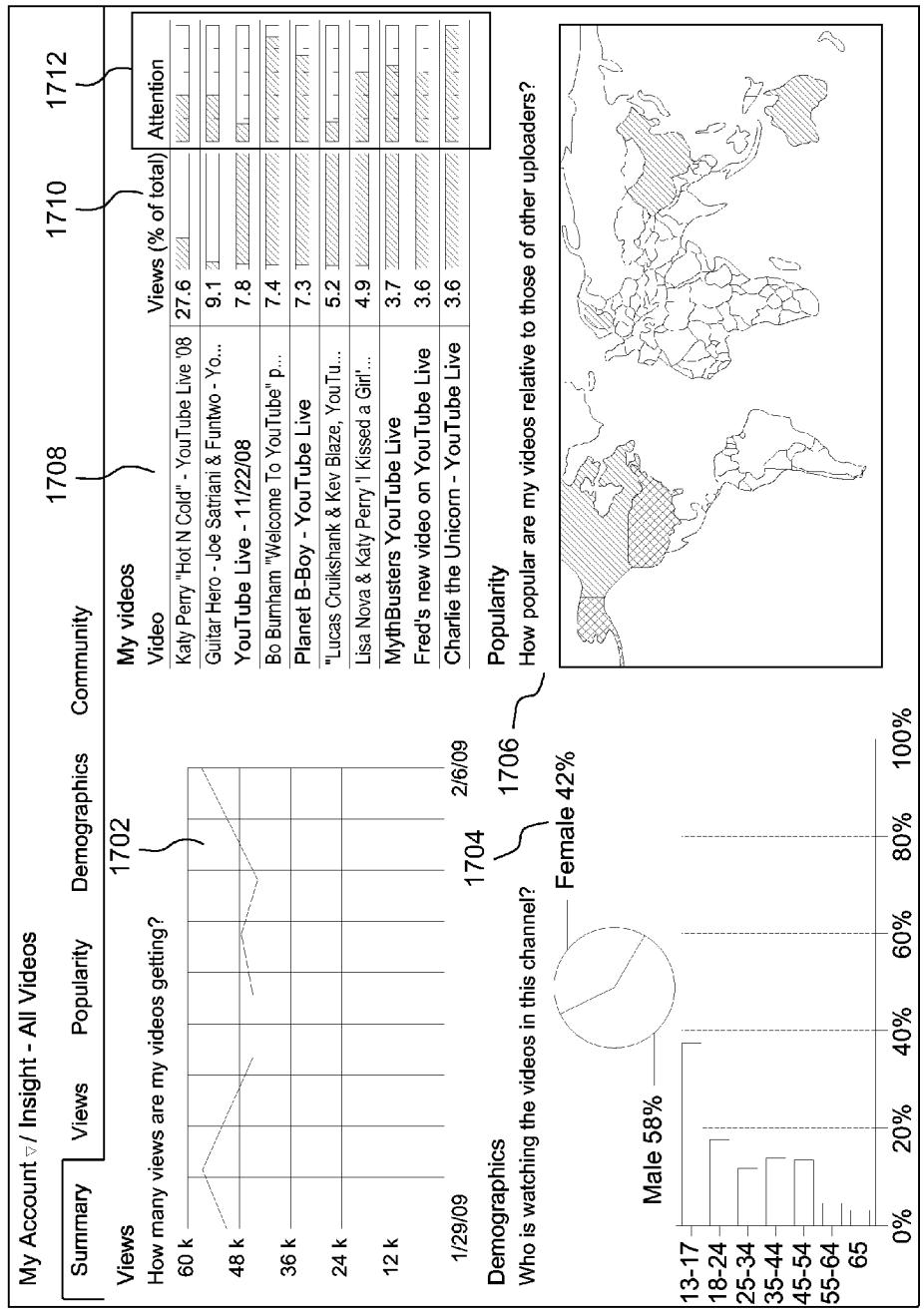
FIG. 17 illustrates a video usage statistics summary page in accordance with an embodiment of the present invention.

FIG. 17 illustrates a summary page that provides a rapid look at various video statistics. In a first region 1702, a chart illustrates a number of views received for all of a user's video over time. A demographics region 1704 summarizes by age and gender who is viewing the user's videos. A popularity region 1706 provides a map that is colored or shaded by country, state or other region to indicate relative popularity of a user's videos. In the illustrated case, the user's videos are most popular compared to average in the United States, and also more popular than average in Canada, Europe, Australia and portions of South America. Each of the user's videos is listed in region 1708, and a percentage 1710 of total views allotted to each video is indicated next to the video name. Also shown for each video is an audience attention graphic 1712, showing the video's ability to hold its audience compared to average. In one embodiment such as where the user has uploaded a large number of videos, only a subset are shown in the summary region 1708. For example, only the videos receiving the ten largest number of views or having the largest audience attention are shown in one embodiment. Selecting any of the "views", "popularity", "Demographics" or "Community" tabs provides respective information on that topic across all videos contributed by the user. For example, selecting the "popularity" tab provides a relative measure, e.g., between 0 and 100, of how the aggregated video views for a user's contributed videos compare to all other users' contributed videos.

Figure 18:
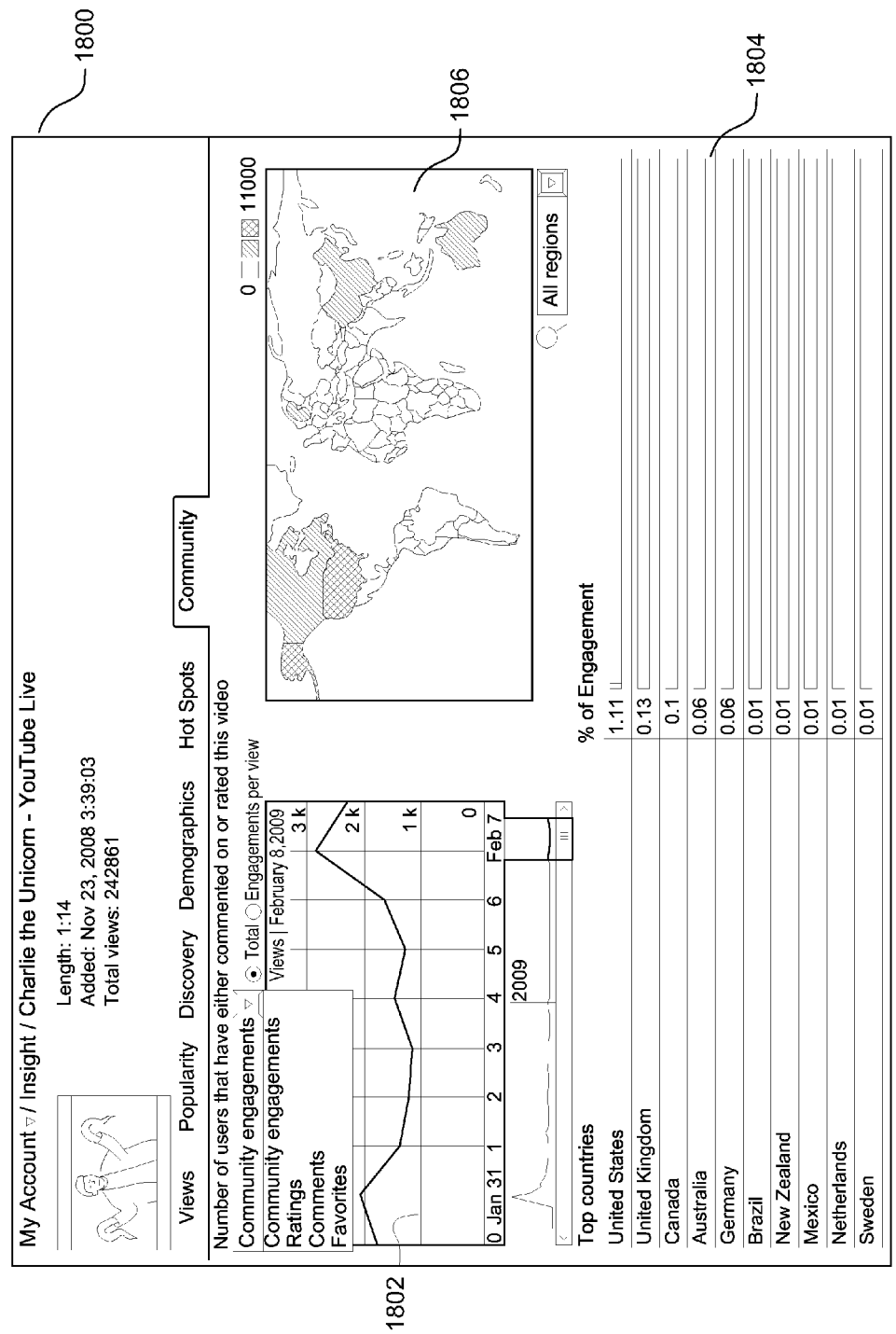
FIG. 18 illustrates a user interface that reports community interest in a video in accordance with an embodiment of the present invention.

FIG. 18 illustrates a user interface that reports community interest in a video. In one embodiment, community interest is a determined by measuring over time comments and ratings of the video, as well as number of times the video has been favorited. A graph of the trend over time is shown in one region 1802 of the user interface page 1800. In region 1804, a percentage of engagement from each of a series of geographic regions, e.g., countries, is shown. In region 1806, a map illustrates graphically the geographic sources of engagement.

In various embodiments, including several of the examples described above, video usage statistics are described as being presented to a particular user and related to that user's contributed videos. However, video usage statistics can also be presented to users other than those who contributed the videos being described by the statistics, and in fact in various embodiments usage statistics are made available to all users of the video hosting site. In various embodiments, the range of statistics presented to users other than the contributor is substantially narrower—for example, viewer demographics may not be shown while viewer geographic region is shown. In one embodiment, the user who contributed the video configures analytics server 130 via a user interface to display or not display any of the available usage statistics. Alternatively, the site operator performs the configuration, which may be at the per-user level, for particular groups of users, or site-wide. In addition, in various embodiments, some functionality is removed from the interface presenting the statistics to non-contributing users. For example, the ability to adjust the time line displayed, or to examine the statistics at finer levels of granularity, e.g., by particular geographic region, may be disabled.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, for convenience we refer to these arrangements of operations as modules, without loss of generality. The described operations and their associated modules may be embodied in software, firmware, hardware, or any combinations thereof.

In one embodiment, an uploader and/or rights owner of the video approves making the information about the video available to certain groups of others (e.g., people in certain categories, such as advertisers; people or groups designated as friends; other people or groups that he designates). For example, if a rights holder desires to monetize his video or groups of videos, he may allow advertisers who are considering placing ads on a particular video or group of videos to view demographic information for that video or group of videos. As another example, a student may allow his teacher to view information about his video.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Upon reading this disclosure, those of skill in the art will appreciate still additional alternative structural and functional designs for a system and a process for displaying data associated with video usage statistics through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for displaying video statistics, the method comprising:
    receiving a request over a network for video statistics related to a video contributed by a contributor to a video hosting website, the view statistics including a number of views received by the video;
    displaying in a user interface a plurality of statistics related to the contributed video, the statistics displayed on a timeline and geographic map, the timeline specifying a first period of time, and the geographic map highlighting a first geographic region from which a greatest number of views were received over the first period of time;
    receiving input specifying a second period of time;
    displaying the second period of time on the timeline; and
    updating the displayed geographic map to highlight a second geographic region from which a greatest number of views were received over the second period of time.

2. The method of claim 1 wherein the timeline displays the number of views received by the video.

3. The method of claim 2 further comprising:
    receiving a selection of one of the geographic regions on the geographic map; and
    displaying on the timeline the number of views received by the contributed video only from the selected geographic region.

4. The method of claim 1 wherein the video statistics include a measure of popularity of the video compared to other users' contributed videos.

5. The method of claim 4 wherein popularity is determined according to a number of views received by the videos.

6. The method of claim 1 wherein the video statistics include a measure of how the contributed video was discovered by viewers.

7. The method of claim 1 wherein the video statistics include a measure of viewer demographics.

8. The method of claim 7 wherein the viewer demographics include a gender of the viewers.

9. The method of claim 7 wherein the viewer demographics include an age of the viewers.

10. The method of claim 1 wherein the video statistics include a measure of community engagement with the contributed video.

11. A video statistics analyzer, comprising:
    at least one processor;
    a data analysis module, executed by the processor, adapted to analyze viewer behavior with respect to a video contributed by a contributor;
    a graph generation module, coupled to the data analysis module and executed by the processor, adapted to display in a user interface a timeline graph of at least one video statistic over a first period of time;
    a map generation module, coupled to the data analysis module and executed by the processor, adapted to display a geographic map, the geographic map highlighting a first geographic region from which a greatest number of views were received over the first period of time; and an interactivity module, coupled to the graph generation module and the map generation module, executed by the processor and adapted to receive user input specifying a second period of time, and to cause the graph generation module to display the video statistic over the second period of time and the map generation module to highlight a second geographic region from which a greatest number of views were received over the second period of time.

12. The video statistics analyzer of claim 11 wherein the timeline graph displays the number of views received by the video.

13. The video statistics analyzer of claim 11 wherein the at least one video statistic includes a measure of popularity of the video compared to other users' contributed videos.

14. The video statistics analyzer of claim 11 wherein the at least one video statistic includes a measure of how the contributed video was discovered by viewers.

15. The video statistics analyzer of claim 11 wherein the at least one video statistic includes a measure of viewer demographics.

16. The video statistics analyzer of claim 11 wherein the at least one video statistic includes a measure of community engagement with the contributed video.

* * * * *